March 2, 1965  G. ORLOFF  3,171,549
MECHANICAL HANDLING APPARATUS
Filed July 18, 1962  3 Sheets-Sheet 1

INVENTOR
George Orloff
By Watson, Cole, Grindle & Watson
ATTORNEYS

March 2, 1965  G. ORLOFF  3,171,549

MECHANICAL HANDLING APPARATUS

Filed July 18, 1962  3 Sheets-Sheet 2

INVENTOR
George Orloff
By Watson, Cole, Grindle & Watson
ATTORNEYS

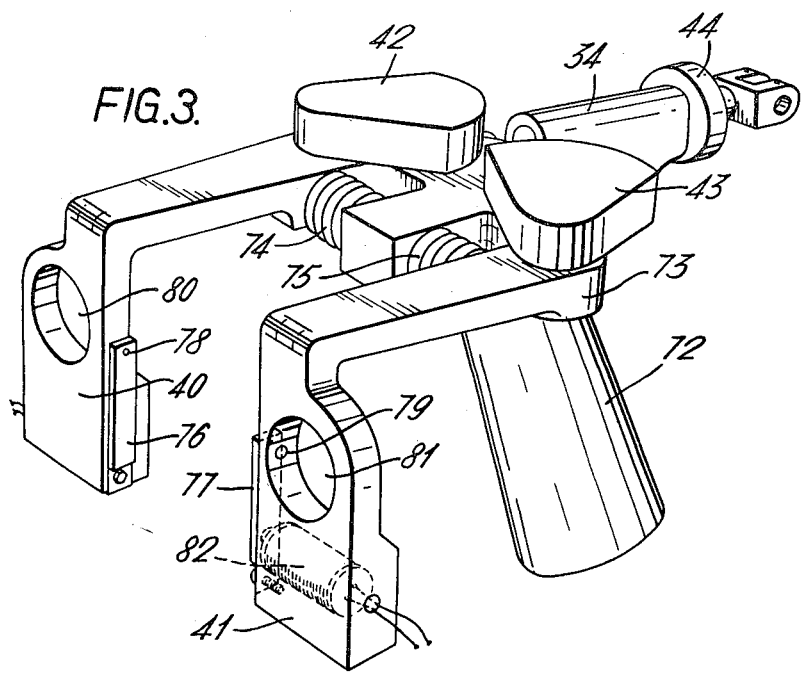

United States Patent Office 3,171,549
Patented Mar. 2, 1965

3,171,549
MECHANICAL HANDLING APPARATUS
George Orloff, London, England, assignor to Molins Machine Company Limited, London, England, a company of Great Britain
Filed July 18, 1962, Ser. No. 210,736
Claims priority, application Great Britain, July 21, 1961, 26,554/61
8 Claims. (Cl. 214—1)

This invention concerns improvements in or relating to mechanical handling apparatus in which gripping members supported from a movable support member grip a load object and move it from one position to another.

In mechanical handling apparatus as disclosed in U.S. application Serial No. 196,810 gripping members may be arranged to close on a load object to be gripped in a substantially vertical direction or in a direction transversely of it. In the latter direction, there is a risk that the load object when lifted will slip with respect to the gripping members unless they grip the load object with sufficient force to cause frictional force to support its weight and to prevent rotational slipping about an axis normal to the faces of the gripping members, should the object be unbalanced about that axis. In the former direction, there is no risk of the object slipping in the manner described when it is lifted. If, however, during movement of the load object by the apparatus, it is positioned so that the faces of the gripping members are no longer normal to the direction of action of gravitational force, slipping may occur. The general object of the invention is to provide mechanical handling equipment in which a load moved by gripping members is prevented from slipping in relation to the gripping members.

It is a further object of the invention that, if slipping does occur, a message to this effect is immediately passed to a human operator, instructing him to cause the gripping members to increase their pressure on the load and thereby arrest the slipping.

It is another object of the invention to provide mechanical handling equipment in which the gripping members have vacuum pads, the vacuum supplying the pressure between the load and the gripping members and being increased to arrest any slipping.

Still another object of the invention is to provide mechanical handling equipment, having a memory circuit, so that if slipping occurs between the load and the gripping members, instructions based on previous experience to increase pressure are immediately issued from the memory to the gripping members.

Figure 1:
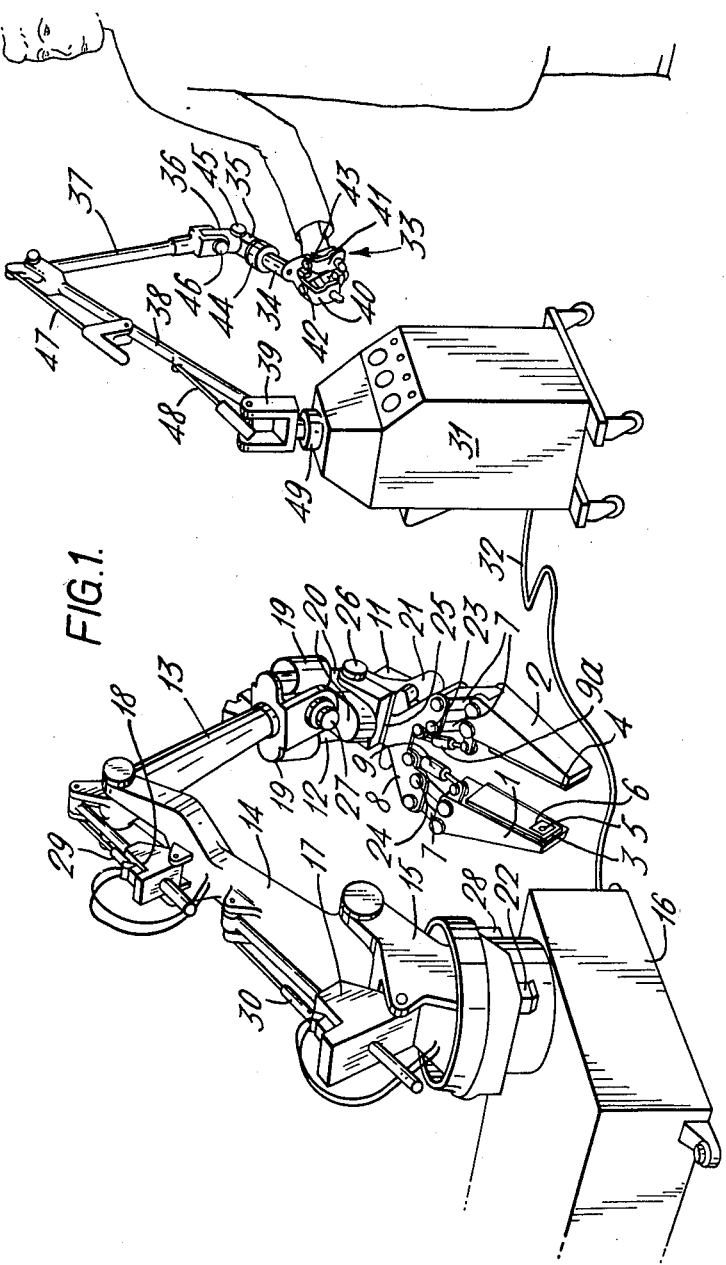
Figure 2:
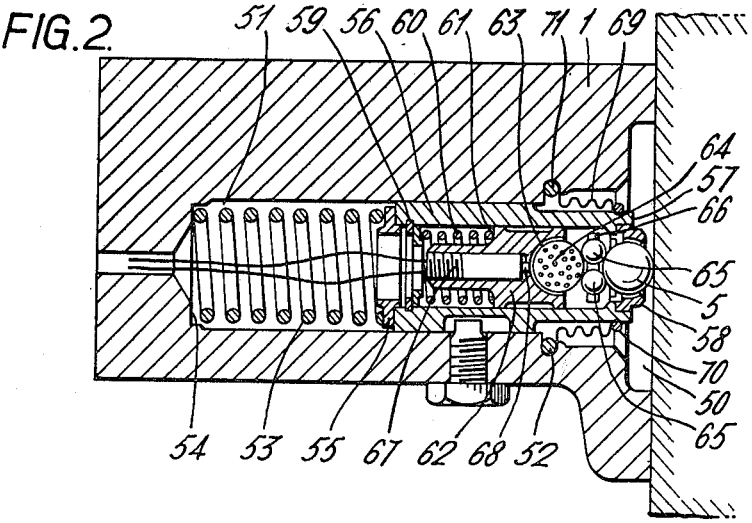
Figure 4:
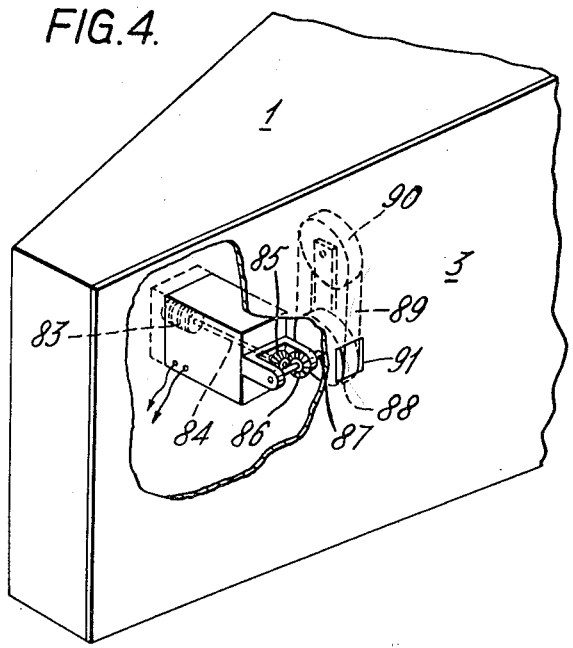

These objects, together with other objects and advantages, will be bettter understood from the following description taken in conjunction with the accompanying drawings, illustrating embodiments of the invention by way of example, in which FIGURE 1 is a perspective view of mechanical handling apparatus embodying means to detect slipping of a load object, FIGURE 2 is a section drawn to a different scale of part of the apparatus shown in FIGURE 1, FIGURE 3 is a perspective view drawn to a yet further scale of a further part of the apparatus of FIGURE 1, FIGURE 4 is a perspective view of an alternative arrangement to that of FIGURE 2.

In a preferred embodiment shown in FIGURES 1, 2, and 3, power assisted mechanical handling apparatus similar to that disclosed in U.S. application Serial No. 196,810 is shown. In FIGURE 1, gripping members 1 and 2 are provided with gripping faces 3 and 4 in each of which a rotatable ball 5 is housed within a recess 6. The members 1 and 2 are supported by means of parallel links 7 from a member 8, both ends of the parallel links 7 being pivoted. Actuators 9 and 9a are pivoted to the member 8 and cause the gripping members 1 and 2 to move. The parallel links 7 and the actuators 9 and 9a enable the gripping members 1 and 2 to be movable together towards and away from each other with the faces 3 and 4 being maintained in approximately parallel relationship. The member 8 is pivotably attached to a member 11 which is similarly connected through further members 12, 13, 14 and 15 to a main base 16. The final member 15 is pivoted to the main base 16 about a vertical axis, the pivoting means being hidden from view. At each pivot point between two adjacent members hydraulic actuators are provided by which the dispositions of the two members extending from that pivot point are controlled relative to each other and hence the gripping members 1 and 2 controlled relative to the base 16. The actuators comprise screw thread actuators 17 and 18 positioned respectively between pairs of members 15, 14 and 14, 13 and double actuators 19, 20 and 21 positioned respectively between the pairs of members, 13, 12; 12, 11 and 11, 8. The final member 15 is rotatable about a vertical axis and is driven by a rotary hydraulic actuator 22.

The actuators are connected to form servo motor arrangements controlled from a multi-channel controller. Electric pick-off devices are associated with each pivot point and with the gripping members. These devices are in the form of rotary pick-offs 23, 24, 25, 26, 27 and 28 and of linear pick-offs 29 and 30, the pick-offs 23 and 24 being associated respectively with the gripping members 2 and 1.

Control means form part of the multi-channel controller housed in a transportable cabinet 31 connected to the main base 16 by an electric cable 32, and comprises a control member 33 supported from a secondary structure formed of a corresponding number of articulated secondary members as those supporting the gripping members 1 and 2, the control member 33 replacing the gripping members and the cabinet 31 the main base 16. Linking the control member 33 and the cabinet 31 is the further set of secondary members 34 to 39. As before, these members are pivoted together by pivots which, in the case of that between the member 39 and the cabinet 31, is vertically disposed and is hidden from view in FIGURE 1. The control member 33 comprises two finger grips 40 and 41 pivotable about the secondary member 34 which is analogous to the main member 8 and which, in its turn, is pivotable about the secondary member 35. Movements of the finger grips 40 and 41 and of the secondary members relative to each other and to the cabinet 31 are detected by sensor devices in the form of additional pick-offs. Two rotary pick-offs 42 and 43 (best seen in FIGURE 3) located on the finger-grips 40 and 41 respectively detect grip movement and three further rotary pick-offs 44, 45, 46 detect movement between the secondary members 34 and 35, 35 and 36, 36 and 37 respectively. Two linear pick-offs 47 and 48 detect movement between the members 37 and 38, 38 and 39 respectively while a final rotary pick-off 49 detects angular movement between the member 39 and the cabinet 31.

FIGURE 2 shows a section through that portion of the gripping member 1 in which the ball 5 is located. The face of the gripping member 1 is recessed at 50, bored at 51 and grooved at 52. A low-rate spring 53 bears against a shoulder 54 with its free end bearing against a ring 55 which is slidable within the bore 51. Abutting the ring 55, a sleeve 56 has its nose end 57 formed to contain a cage 58 retaining the ball 5 and its rear end terminating in a locking ring 59. Bearing against the locking ring 59 a high-rate spring 60 acts against a stepped portion 61 of a piston 62, which is thus urged to the right as viewed in FIGURE 2. The right-hand face of the piston 62 is recessed to take a hemispherical low friction shell such as polytetrafluoroethylene (hereinafter called PTFE) which, in its turn, houses a ball 64 between which and the ball 5 is situated a triple cluster of small balls 65 in a cage 66. An inductive pick-off 67 is screwed into the piston 62. The ball 64 is made from a magnetic material and resembles a golf ball in that its surface is covered with regularly spaced indentations, each of which is filled with a non-magnetic material. Movement of the ball 64 thus results in the pick-off 67 producing a signal with a varying characteristic, such as frequency, and the varying signal being amplified in a known manner to produce an input signal to the control means. A bellows piece 69 is attached to the outside of the nose of the sleeve 56 by a ring 70 with its opposite end secured within the groove 52 by a clip 71.

It is to be understood that a similar arrangement to that described for producing a varying signal indicative of slipping is contained within the gripping member 2, although this cannot be seen in FIGURE 1.

Referring to FIGURE 3, the control member 33 is seen to comprise the two finger-grips pivoted to a pistol-grip 72, one pivot being visible at 73. In addition to hydraulic bellows actuators 74 and 75 which impart feel feed-back to the operator, each finger grip is provided with a vibrator 76 and 77 having a blunt stylus 78 and 79 penetrating through the material of the grip into first finger and thumb holes 80 and 81 respectively. Each vibrator is operated by an electro-magnet, of which one 82 can be seen in FIGURE 3. The pulsating signal between the element 67 and the inner piston 62 is amplified by known means which are not illustrated and is made to operate the electro-magnets.

In operation the embodiment described and illustrated in FIGURES 1, 2 and 3 requires an operator to grasp the pistol grip 72 and to insert the forefinger and thumb of his right hand in the holes 80 and 81 of the finger grips 40 and 41. Movement of the control member 33 by the operator produces displacements of the secondary members with attendant order signals generated by the pick-offs at the various articulations of those secondary members. These signals measure the coordinates of the positional state of the control member 33 in a generalized coordinate system in which the individual coordinates are the relative displacements of the secondary members. Servo motor arrangements associated with the members of the main structure carrying the gripping members 1 and 2 produce corresponding relative displacements at corresponding articulations in that structure. The gripping members 1 and 2 are, therefore, positioned in the corresponding generalized coordinate system defined by the geometry of the members and pivots of the main structure to a position, the coordinates of which are a function of the coordinates of the position occupied by the control member 33.

If the operator exerts a gripping action on the finger grips 40 and 41, a corresponding movement of the gripping members will cause them to close on a load object inserted therebetween. If the gripping members are horizontally disposed with the gripping faces 3 and 4 substantially vertical, the load object is unsupported and is able to slip if the gripping force exerted normally to the gripping faces is insufficiently high. As soon as the load object starts to slip, the ball 5 which is in contact with it, being held there by the action of the spring 53, rotates. Rotation of the ball 5 causes the balls of the cluster 65 to rotate and thus the ball 64 to rotate also. While the face of the ball 64 is smooth, thereby offering no hindrance to rotation, the PTFE inserts cause an interruption to the flow of electrical energy between the probes of the element 67 and of the inner sleeve 62. This interruption is made to cause an interrupted current to flow through the vibrator 82 (FIGURE 3) within the finger grip 41, thus causing the blunt stylus 79 to vibrate. The vibration of the stylus 79 is imparted to the inside of the thumb grasping the finger grip 41 so that the operator is informed of slipping of the load object. His reaction to this information, either instinctive or conscious, is to grasp the finger grips 40 and 41 more tightly, thereby causing an increased gripping force to be exerted by the gripping members 1 and 2. As soon as this exerted force is sufficient to prevent further slipping, the ball 5 ceases to rotate and the stylus 79 to vibrate. It is to be noted that although the rotation of the ball 5 and the vibration of the stylus 79 only have been described, there are a similar ball and slip detecting mechanism inside the gripping member 2 which, on actuation, causes the stylus 78 to vibrate within the finger grip 40. Similarly, for the sake of convenience, rotation of the ball 5 has been described as causing the stylus 79 to vibrate, whereas it could equally well cause the stylus 78 to vibrate.

If, when the load object is grasped, the gripping members 1 and 2 are in such position that their faces 3 and 4 are substantially horizontal, no slipping can occur but when the load object is moved in such a way that these faces no longer remain substantially horizontal, slipping can take place and can be prevented as already described. When the center of gravity of the load object lies in a vertical line which does not pass through the gripping area, i.e., the area of the load object in contact with the faces 3 and 4 of the gripping members 1 and 2, rotational slipping can take place if the gripping force is too small. Rotational slip is detected by the mechanism described except in the one case where the axis of rotation of slip passes through the center of the ball system. To obviate this one exception it is necessary to offset the ball systems in the two gripping members 1 and 2 so that the axis of rotation cannot pass through the center of both ball systems.

In the embodiment just described control of the system is arranged to operate on the gripping members 1 and 2 as a force controller. Thus actuation of the control member 33 is effective to vary the pressure to which the hydraulic fluid is regulated so as to vary the pressure applied to the hydraulic actuators 9 and 9a and thus the gripping effect exerted by the gripping members on the load object. In an alternative arrangement, control is exercised by regulating the flow of hydraulic fluid to the actuators 9 and 9a so that the system becomes a movement or displacement controller. To prevent excessive movement of the gripping members in the latter embodiment or an excessive force being exerted by them in the former, a force feedback is employed with hydraulic fluid admitted to the hydraulic bellows actuators 74 and 75 (FIGURE 3).

Although an inductive pick-off has been described, the invention is not necessarily restricted to such. For instance, the ball resembling a golf ball may be constructed of conducting material with the indentations filled with a non-conducting material. By arranging two probes to penetrate the low friction shell and by connecting each across an E.M.F., a pulsating signal results as soon as the golf-like ball rotates. This arrangement possesses the advantage that only one limit is required to detect all cases of slip, including rotation slip about an axis normal to the gripping face and passing through the center of the ball. By arranging one probe to be a point probe and the other to have a length long enough to be always in contact with a conducting as well as a non-conducting portion of the ball, all cases of slip can be detected.

Among other embodiments included in this invention are a ball whose surface alternates in every direction with black and white areas. A photoelectric cell contained in the piston detects rotation of the ball and thus slip of the load object.

A further embodiment is shown in FIGURE 4 in which a gripping member 1 is provided with a tachogenerator 83 fixed to one end of and driven by a shaft 84. The other end of the shaft 84 has a bevel gear 85 fixed to it, the gear 85 meshing with a further bevel 86. The bevel 86 is fixed to a shaft 87 to which is also attached a drum 88. A friction band 89 passes around the drum 88 and around a further drum 90. A window 91 in the face 3 of the gripping member 1 is provided in such a position that a portion of the friction band 89 projects outwards beyond the plane of the face 3.

Thus when the face 3 comes into contact with a load object, a portion of the band 89 is caused to be in intimate contact with the load object also. If the load object slips and has a component of slip in a direction parallel with the axis of movement of the band 89, the band will move in the direction of the component causing the drum 88, the bevels 85 and 86 and the shaft 84 all to rotate and thus the tachogenerator 83. The tachogenerator produces an electric signal having an amplitude dependent on its rotational speed. The amplitude of the signal is converted in a known way to produce an interrupted voltage operating the vibrators within the finger grips 40 and 41 and thus the styli 78 and 79. The control is exercised as described hereinbefore. In this embodiment the friction band 89 could be a drum connected to a tachogenerator.

Since, however, cases can occur when the load object slips without any movement of the band 89, such for instance when the direction of slip has no component in the direction of the longitudinal axis of the band, or when rotational slip occurs about an axis normal to the face 3 with the axis passing through the geometric center of the drum 88, it is necessary to provide a second unit similar in every way to that illustrated in FIGURE 4 but having its axis rotated about 90° in the plane of the face 3 and offset from the first unit. This second unit is not shown in FIGURE 4 but the two units linked in parallel are sufficient to cover every case of load-object slip.

The invention is also applicable in mechanical handling apparatus in which one or more of the control actions are automatic. If desired, all the control actions may be automatic and controlled, for example, in accordance with a predetermined sequence or in accordance with instructions provided on a tape or card. Alternatively, the control actions controlling the movements of the movable support means for the gripping members and hence the movements of a gripped load object may be controlled manually while the control actions controlling the gripping action of the gripping members may be controlled automatically to increase the gripping force in response to the detection, by the detector means, of slipping between a load object and a gripping member.

What I claim as my invention and desire to secure by Letters Patent is:

1. In mechanical handling apparatus, an articulated structure, two gripping members supported from the articulated structure and adapted on actuation to grip and to move a load object gripped therebetween, a secondary articulated structure, and two analogue control members supported from the secondary articulated structure and adapted on movement to cause said gripping members to move in an analogous manner, said gripping members having detector means which provide an output signal when said load object moves relatively to said gripping members, and indicator means coupled with said control members adapted to provide a tactile signal indicative of load slipping in response to said output signal.

2. Apparatus as claimed in claim 1, wherein said detector means comprises a movable member in contact with said load object, part of the movable member being free to move when said load object moves relatively to said gripping members and movement of part of said movable member causing said output signal to be produced.

3. Apparatus as claimed in claim 2, wherein said movable member is a ball.

4. Apparatus as claimed in claim 1, wherein said indicator means is a vibrator producing an interrupted tactile signal.

5. Apparatus as claimed in claim 1, wherein said gripping members are power assisted.

6. Apparatus as claimed in claim 5, wherein said two gripping members are actuated by a fluid operated cylinder, the force with which said gripping members grip said load object being controlled by varying the pressure of the fluid.

7. Apparatus as claimed in claim 5, wherein said two gripping members are actuated by a fluid operated cylinder, the movement of which is controlled by the quantity of fluid admitted to it.

8. Apparatus as claimed in claim 1, wherein said detector means comprises two rotatable bands each having its axis of rotation spaced from the other by 90° in a plane parallel to the plane of the face of a gripping member and each adapted to produce said output signal on rotation.

References Cited by the Examiner

UNITED STATES PATENTS 2,846,084  8/58  Goertz et al.
2,927,302  3/60  Steigwald.

FOREIGN PATENTS 781,465  8/57  Great Britain.

HUGO O. SCHULZ, *Primary Examiner.*